United States Patent [19]

Wilson

[11] 3,912,943

[45] Oct. 14, 1975

[54] VIDEO THRESHOLDER

[75] Inventor: Melvin G. Wilson, Rochester, Minn.

[73] Assignee: International Business Machines Corporation, Armonk, N.Y.

[22] Filed: Aug. 9, 1974

[21] Appl. No.: 496,235

[52] U.S. Cl. ................. 307/235; 328/146; 178/7.1; 178/DIG. 6

[51] Int. Cl.$^2$ ........................................ H03K 5/20

[58] Field of Search ...... 307/235; 328/146; 178/7.1, 178/DIG. 6

[56] References Cited

UNITED STATES PATENTS

| | | | |
|---|---|---|---|
| 2,885,551 | 5/1959 | Greanias | 328/146 |
| 3,566,281 | 2/1971 | Baumann | 307/235 X |
| 3,804,979 | 4/1974 | Knowles | 307/235 X |

*Primary Examiner*—John S. Heyman
*Attorney, Agent, or Firm*—J. Michael Anglin

[57] ABSTRACT

A two-valued digital signal is produced from an analog video signal by taking a fraction of the difference between a white peak signal and a black peak signal. The peak signals decay slowly between video pulses. A jump circuit changes one or both of the peak signals rapidly when the video signal has a certain relation to a delayed and level-shifted replica of the video signal.

12 Claims, 5 Drawing Figures

VIDEO THRESHOLDER

BACKGROUND

The present invention relates to electrical signal conversion, particularly concerns a thresholder for converting analog video signals into a digital output.

In many applications, such as record-controlled machines, it is desired to convert an analog video signal into a digital signal having one value representing a "white" color on a scanned article, and a second value representing "black" on the article. The video signal amplitudes from a scanner may vary considerably, from such causes as specks or "noise" on the scanned article, smudging, printing variations, ambient light levels, and so forth. Therefore, systems have been designed to threshold the video signal at a variable level. Commonly, a follower circuit tracks the maximum and/or minimum peaks of the video signal, and derives a threshold equal to some fraction of the difference between them. Such thresholders may be adapted to change a peak signal quickly in one direction, but more slowly in another direction. Assuming, for example, that white is represented by high amplitudes and black by lower amplitudes, a white follower may increase the white peak signal quickly when the video signal exceeds the peak signal; when the video signal decreases toward black, the peak signal decays slowly downward.

Normally the colors white and black have no significance as such. The background of a scanned pattern is usually called "white", regardless of its actual color, and the pattern itself is called "black". For some purposes, however, both white and black areas are significant to the pattern. In a scanner for the Universal Product Code (UPC) symbol, for example, digits are represented by the relative widths of black and white areas or bars in a label printed on or affixed to an article. Therefore, it is of great importance to threshold the video signal such that these relative lengths are preserved as accurately as possible.

In the course of designing an optical reader for the UPC code, a previously unheeded phenomenon was noted. The reader appeared to be subject to an optical illusion, in that narrow white bars were consistently reduced in width by the thresholder, white black bars of exactly the same width were thresholded correctly. This was called the "shrinking white bar" effect, and it caused erroneous decoding in a number of test cases. While the exact cause of this phenomenon may not be known, it is thought to arise from a variation in the depth at which reflections occur in the labels. Light incident upon white or colored paper is not, in general reflected wholly from its surface. The light wave penetrates into the paper, and different parts thereof are reflected back from various depths within the paper. The basic function of black or colored inks is to reduce reflections by absorbing at least some of the incident light. The ink may absorb light both when it initially strikes the ink, and on a return path after passing through the ink and being reflected within the paper. One or the other of these absorption mechanisms may predominate for various types of ink.

The shrinking white bar effect seems to occur when relatively opaque ink is used with normal white paper, which is relatively transparent. Light reflected from inked areas depends essentially upon the characteristics of the ink; but light reflected from the paper is affected both by the paper characteristics and by the presence of nearby inked areas, because some of the light which impinges upon the paper in a white area is trapped under the ink and absorbed. For wide white areas or bars, the trapped reflections are a small part of the total reflections from the entire white bars. For narrow white bars, however, a significant part of the incident light may be lost under the nearby ink. Thus the narrow bar appears to be narrower and darker than it actually is.

This problem could not be satisfactorally resolved by conventional methods. Narrow white bars are frequently degraded by the thresholder to a point where the label code was rejected or misrecognized. Sometimes narrow bars were missed completely. No conventional thresholder was found which could counteract the shrinking effect.

SUMMARY

The present invention provides a novel means for increasing the accuracy of video-signal thresholding, especially where narrow areas must be precisely measured. The invention alleviates the shrinking white bar effect with a thresholder which is effective, simple and inexpensive. Concomitantly, it also compensates for limited video bandwiths, which may cause similar problems, although for an entirely different reason.

Generally speaking the invention proposes a video thresholder which both delays and offsets the level of the video signal, and which stores a peak value of the video signal. When the video signal bears a predetermined relation to the delayed offset signal (higher or lower, depending upon the signal polarities chosen), a threshold derived from the peak signal is rapidly changed toward the amplitude of the video signal. This may be accomplished by changing the peak signal itself. A two-valued digital output is produced by comparing the threshold with a signal related to the video signal, such as a delayed video signal.

The rapid threshold change may occur only a single direction. The basic invention, however, was also found to compensate for inaccuracies due to video bandwith limitations. Hence, it may additionally be desirable to change the threshold rapidly in an opposite direction, when the video signal bears a certain relation to another delayed offset signal.

The present invention has been found to significantly reduce the reject rate of the reader for which it was designed. When scanning small (0.8 size) UPC labels, for example, the reject rate was reduced by a factor of 6 in an otherwise unchanged test machine. This difference alone reduced the reject rate from an unacceptable level to a very good level.

Other advantages and features of the invention, as well as modifications obvious to those skilled in the art, will become apparent from the following description of a preferred embodiment thereof.

DRAWINGS

DESCRIPTION

Figure 1:
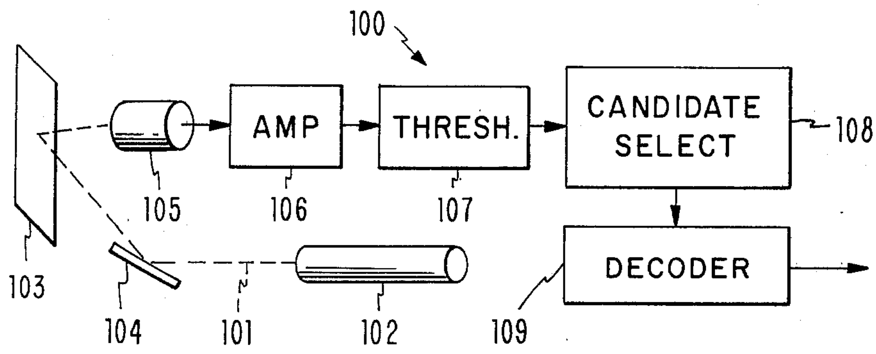
FIG. 1 is a block diagram of an optical code reader in which the invention finds utility.

FIG. 1 shows in block form a bar-code reader 100 in which the present invention is useful. A light beam 101 from a laser 102 is scanned across a coded article 103 by an oscillating deflection system 104. A photomultiplier (PMT) detector 105 converts diffuse reflections from article 103 to analog video signals which are amplified by a conventional amplifier 106. Preferably, PMT 105 is operated at a low gain, in order to restrict its anode current at extreme ambient light levels. Amplifier 106 preferably has a relatively small gain at low frequencies, to reduce the effects of varying ambient light and 120Hz noise.

The purpose of thresholder 107 is to convert these amplified signals to a two-valued binary signal whose successive values indicate whether the coded article is "black" or "white" at successive areas traversed by beam 101. To perform this function, thresholder 107 derives from the analog video a "white peak" signal which follows the maximum video signal. Unit 107 also derives a similar "black peak" signal which follows the minimum video. (In this embodiment, white signals were arbitrarily assigned to be electrically more positive than black signals.) A threshold signal of one-half the difference between the white and black peak signals is then compared with the video signal. Whenever the video is more positive than the threshold, unit 107 produces a digital signal value or level representing white or background color code bars on article 103; otherwise, a signal representing black code bars is produced.

The digital signal from thresholder 107 is used by candidate select logic 108 to determine when a coded label is being scanned. This unit measures the lengths of the white and black signal levels in terms of fixed time intervals, and detects the presence of a predetermined series of time ratios between successive levels. When a proper series is detected, the candidate signals are converted to a standard digital code by decoder 109. The output of decoder 109 may then be transmitted to a storage, display, terminal control unit or data processor (not shown) for further use.

Figure 2:
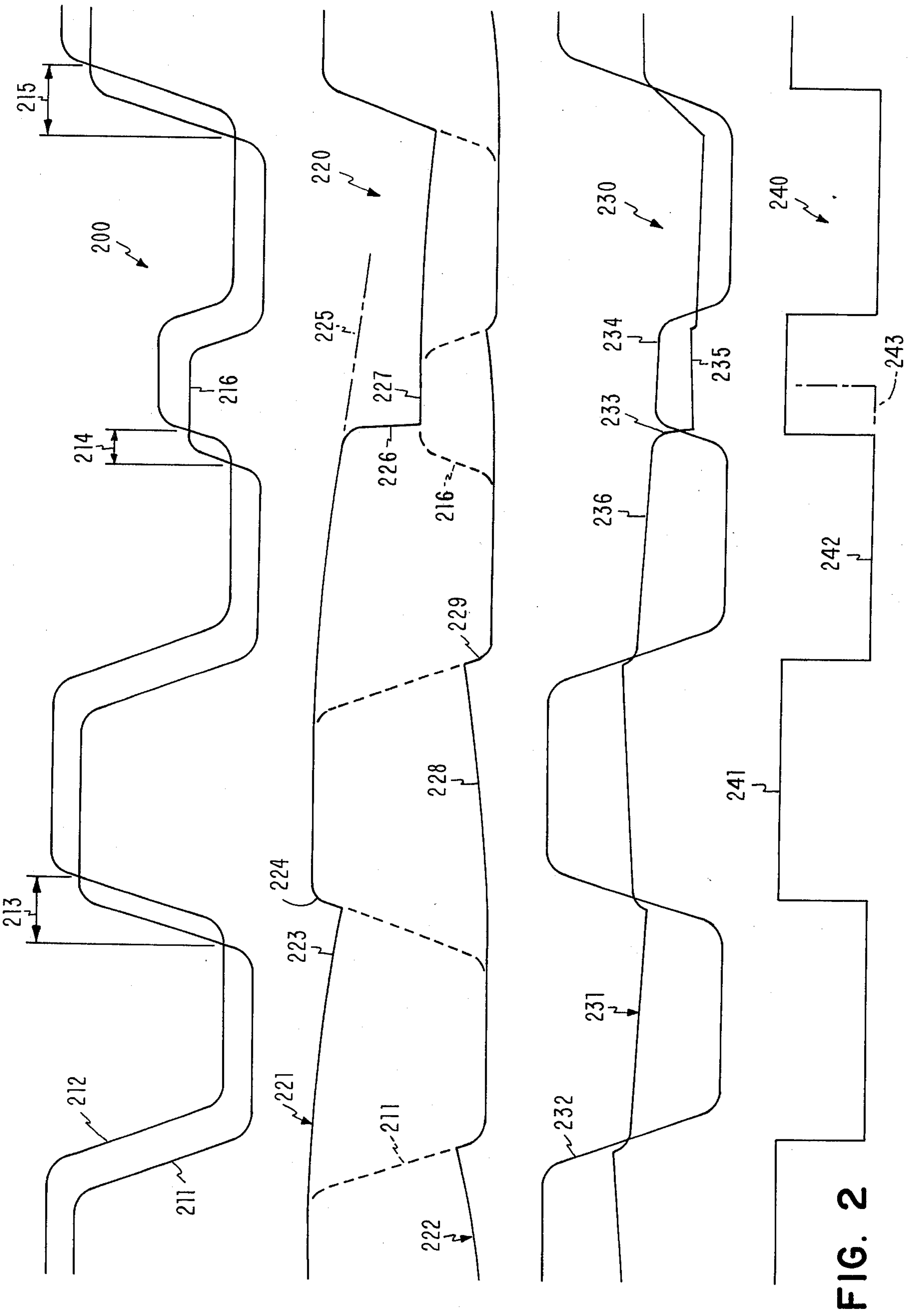
FIG. 2 illustrates waveforms useful in explaining the operation of the invention.

FIG. 2 illustrates the operation of thresholder 107 both in normal conditions and in the presence of a shrinking white bar. In the uppermost set 210 of waveforms 200, the numeral 211 represents the original video signal from aplifier 106, FIG. 1. Numeral 212 represents a replica of waveform 211, but slightly delayed and offset in absolute level. For the purposes of the present invention, the significant features of waveforms 210 are the intervals 213, 214 and 215, during which the delayed offset video 212 is lower in amplitude than the original video 211. Pulse 216 indicates a shrunken white bar, whose amplitude is significantly smaller than those of the other, wider bars.

In the waveform group 220, the white peak signal is indicated by 221, and the black peak signal by 222. The undelayed video 211 is shown in dotted lines for reference. For widely separated code bars, white peak signal 221 rides along the white tops of video signal 211, and decays only slightly, as at 223, when signal 211 drops to black levels. When a further white video pulse arrives, signal 221 rises quickly to meet its highest amplitude, as shown at 224. The droop of signal 221 at 223 is exaggerated in FIG. 2; in actual practice, its time constant is, for example, about five times the expected spacing between relatively wide pulses.

If white peak 221 were to maintain its long time constant past shrunken white bar 216, as shown by dotted line 225, a threshold derived therefrom may lie above part or all of the amplitude of this bar. Accordingly, signal 221 executes a rapid "white jump" at 266, until it reaches the amplitude 227 of pulse 216. It follows the top of pulse 216 and thereafter again decays slowly until it is intercepted by the rising edge of the next white pulse. Signal 221 then follows this pulse upward to its highest value as at 224.

Black peak signal 222 rides the minima of the undelayed video signal 211. Signal 222 also decays slowly, but in an upward or positive direction, as indicated at 228. when intercepted by the falling edge of a black pulse, signal 222 follows it downward, as at 229. Again, waveforms 221 and 222 have been slightly exaggerated in order to show more clearly their relationships to waveform 211.

Waveform group 230 depicts a threshold signal 231, whose amplitude is 50% of the instantaneous difference between white peak signal 221 and black peak signal 222. Some other percentage could be chosen, or even some other function of signals 221 and 222. One-half the difference was selected because the widths of both the black and the white code areas are significant in the UPC code. Threshold 231 is compared with a replica 232 of the original video signal. This replica is delayed from the original video 211 as is signal 212, but it is not offset in amplitude. The delay of signal 232 is conveniently the same as that of 212; its purpose is to allow for the unavoidable time lags in the circuits which produce threshold 231.

Threshold 231 drops quickly at point 233, in response to the white jump shown at 226. Therefore, its amplitude at 235 is below that of the delayed shrunken white bar 234 for essentially its entire width. Without the effect of the white jump, the slowly decaying portion 236 of threshold 231 would be above part or all of bar 234. Despite the low threshold value at 235, the rapid rise of white peak signal 221 at the next white bar pulls the threshold up sufficiently to intercept the rising edge of its delayed image signal 232 at about 50% of its total height, as desired.

The two-valued digital output wave 240 results from a comparison of the amplitudes of threshold 231 and the delayed video signal 232. Whenever the delayed video exceeds the threshold, waveform 240 maintains a constant positive value indicating white, as at 241. When the threshold exceeds the delayed video, a zero value signifies black, as at 242. Line 243 illustrates a portion of a white output signal which would be falsely classified as being black, in the absence of the white jump shown at 226.

Figure 3:
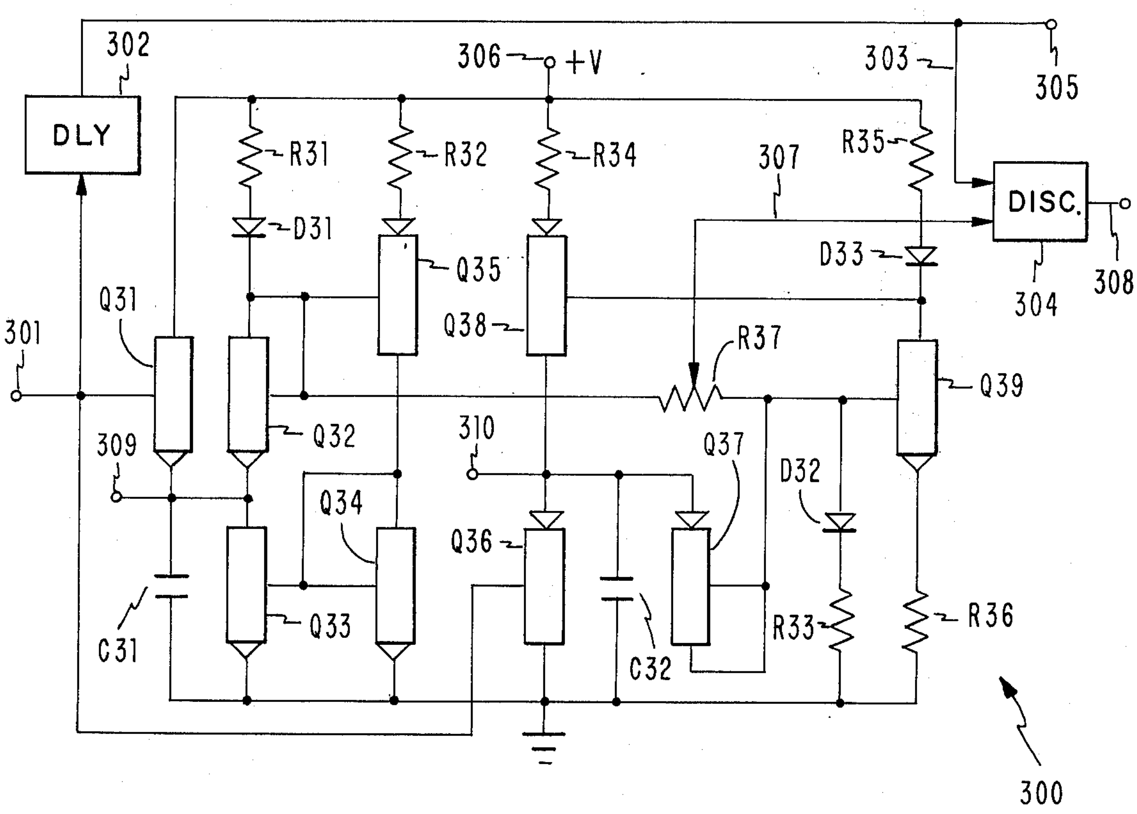
FIG. 3 is a schematic diagram of circuitry employed in the invention.

FIG. 3 is a schematic of a circuit 300 for following the white and the black peaks of a video signal, with slow decays in both peak values. Circuit 300 also derives the threshold signal and compares it with the video signal to derive the digital output signal.

Circuit 300 receives video signal 211, FIG. 2, from amplifier 106, FIG. 1, at an input terminal 301. A conventional delay circuit 302 produces the delayed video signal 232, FIG. 2. The delay may typically be on the order of 200 nanoseconds (nsec). The output of delay 302 is fed to one input 303 of discriminator 304, and is also made available externally at terminal 305. Transistors Q31 and Q32 form a differential amplifier having unity feedback, because of the collector-base connection of Q32. The base of Q31 is coupled directly to the undelayed video from terminal 301, and its collector is coupled directly to a supply voltage +V at terminal 306. The Q32 collector is tied to the supply voltage through a load resistor R31 and a voltage-matching diode D31. Coupled to the emitters of Q31 and Q32 is a capacitor C31 for storing white (positive) peak voltages. Transistors Q33 and Q34 form a controlled current source for providing the aforementioned slow decay in the white peak voltage stored on C31. As is well known, Q33 and Q34 should have matched Vbe drops to perform as an accurate current source. This source is controlled by PNP transistor Q35, whose base is coupled to the output of Q32. Supply voltage is fed to the emitter of control transistor Q35 through a dropping resistor R32.

Transistors Q36 and Q37 operate as a second unity-gain differential amplifier. The base of Q36 receives the video signal from terminal 301. The emitters of Q36 and Q37 are tied to a capacitor C32 for storing black (negative) peak voltages. The collector-base connection of Q37 is tied to its supply voltage (i.e., ground) through resistor R33 and level-compensating diode D32. Transistor Q38 and resistor R34 provide the slow decay function for black-peak capacitor C32. Since black peaks are represented by low voltages, the voltage on C32 decays upwardly, rather than downwardly as does that on C31. The amount of decay current through Q38 is set by control transistor Q39, whose base is coupled to the output of differential-amplifier transistor Q37. The collector of Q39 is tied to the supply voltage +V through resistor R35 and compensating diode D33; its emitter is tied to ground through R36.

The white-peak and black-peak voltages, from the collectors of Q32 and Q37 respectively, are coupled to opposite ends of divider potentiometer R37. The tap of R37 therefore carries a voltage which is a predetermined fraction of the difference between the white and black peak signals stored on capacitors C31 and C32. In the present application, it is preferable to set the tap of R37 at its midpoint, so that the threshold voltage applied to reference input 307 of discriminator 304 is 50% of the difference between the peak signals. Unit 304 is a conventional discriminator for producing a two-valued output signal on line 308. This signal, shown as 230 in FIG. 2, has a constant high value such as 231 when the delayed video signal on input 303 exceeds the threshold signal, shown as 231 in FIG. 2, on reference input 307; otherwise, its output is zero, as at 232 in FIG. 2. Output line 308 is connected to candidate select logic 108, FIG. 1.

The current through R37 in FIG. 3 is proportional to the amplitude of the video signal at input 301. The emitter current of Q32 is the difference between that current and the current through R31. Therefore, the discharge current from C31 is the difference between these two currents and the collector current of Q33. If the Q33 collector current is made equal to the R31 current for all black-peak levels, then the decay of the C31 black-peak voltage is proportional to the video-signal amplitude, a desirable feature in many applications. Q33 collector current is derived from Q35, whose base current is controlled by the collector voltage of Q32. If R31=R32, then the R31 current equals the Q33 collector current within the Vbe match between Q33 and Q34, independently of the absolute level of the white peak voltage from Q32. Similarily, if R34=R35 and R33=R36, the collector current of Q37 equals the charging current to C32 from the collector of Q38. Therefore, the charging rate of C32 is also proportional to the video signal amplitude, independently of the level of the black peak voltage from the output of Q37.

Circuit 300 therefore provides a white peak voltage stored on C31 and output from Q32. The black peak rises quickly to follow positive excursions of the video signal, as shown at 224 in FIG. 2. But, when the video signal decreases, Q33 pulls current out of C31 to lower its voltage slowly, at a rate proportional to the video amplitude. In a complementary fashion, the black peak voltage, stored on C32 and output from Q37, falls quickly to follow negative video excursions, as at 229. When the video signal increases toward white, as at 228, Q38 pumps current into C32 to increase its voltage slowly and at a rate proportional to the video amplitude. The decay rates may differ for the black and white peak signals; for the present purposes, however, they are approximately equal. The connections of terminals 309 and 310 will be explained in the following description of FIGS. 4 and 5.

Figure 4:
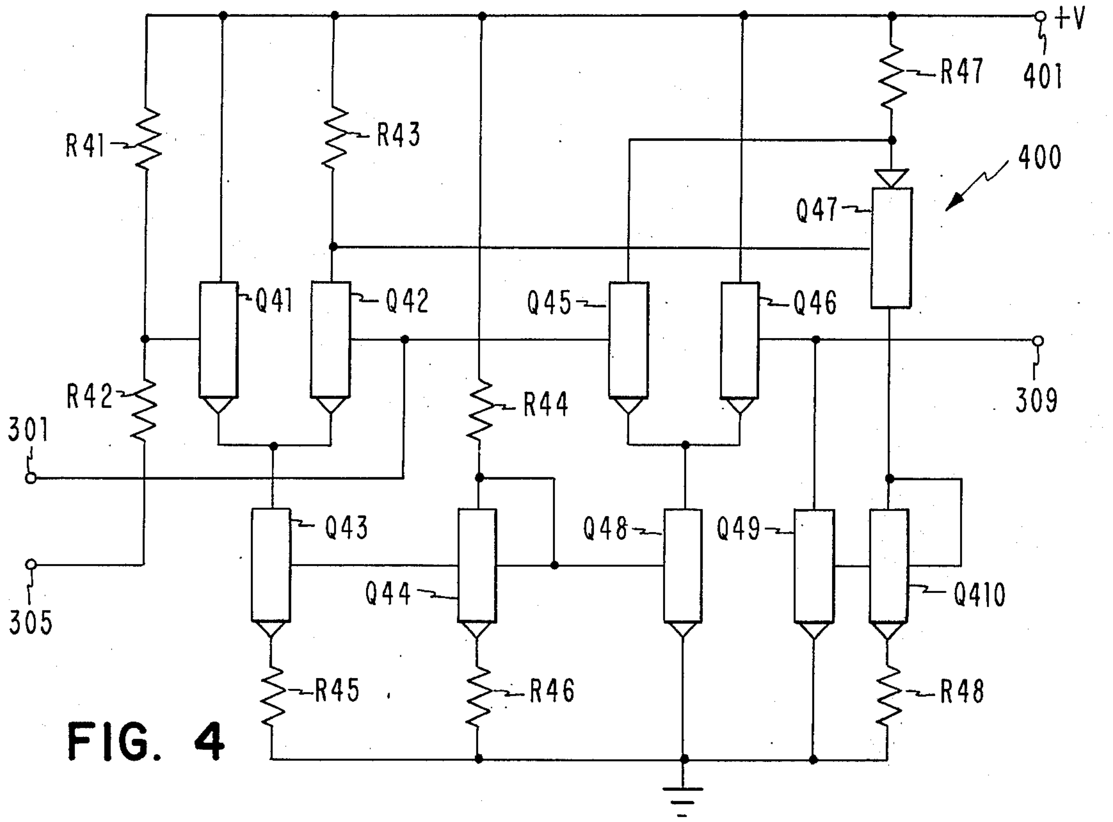
FIG. 4 shows a "white jump" circuit used in the invention.

FIG. 4 shows a circuit 400 which cooperates with circuit 300, FIG. 3, for providing the "white jump" effect illustrated at 226 in FIG. 2. The unaltered video signal is received at terminal 301 as designated in FIG. 3. This signal is transmitted to one side of a voltage discriminator having transistors Q41 and Q42. The other side of this discriminator receives delayed video from terminal 305, FIG. 3. The required amplitude offset, shown for signal 212 in FIG. 2, is provided by voltage-divider resistors R41 and R42, R43 is a load resistance for the discriminator output. Terminal 401 provides a positive supply voltage for these and the remaining transistors of circuit 400.

Transistors Q43 and Q44 and resistors R44, R45 and R46 provide a constant current source for this discriminator, as in conventional practice. The Vbe drops of Q43 and Q44 should be matched. R45 and R46 are small swamping resistors for equalizing the currents through Q43 and Q44. The collector voltage of Q42 approaches the supply voltage when the delayed and offset video at the base of Q41 exceeds the original video at 301. This voltage decreases during the intervals 213–215 shown in FIG. 2.

Transistors Q45 and Q46 form another discriminator, which compares video from 301 with an input voltage on line 309. When the voltage on 309 decreases below the video voltage, Q45 conducts heavily, to drop a large voltage through resistor R47. This condition turns off control transistor Q47, which had previously been turned on by the lowered collector voltage at Q42. Transistors Q44 and Q48 form a constant current source for the second discriminator, Q45 and Q46. Since Q48 does not have an emitter resistor, this current is about twice the emitter current of the Q41–Q42 pair. Transistor Q49 and Q410 constitute a controlled current source which pumps current out of terminal 309 when Q47 conducts. Since Q410 has an emitter resistor R48 while Q49 does not, the current through Q49 is several times (preferably 10 to 20 times), the current through diode-connected transistor Q410.

Transistor Q47 thus causes the sinking of a large current, about 30mA, into terminal 309 whenever the video amplitude at 301 exceeds the offset delayed video at the base of Q41. This current is turned off, however, as soon as the white peak voltage is reduced to the level of the video signal. The current source has a relatively large amplitude in order to decrease the white peak voltage rapidly. These waveforms are shown as 211 and 212, respectively in FIG. 2. Theoretically, control transistor Q47 would cause current to flow into 309 from the beginning of intervals 213–215. But, because of finite delays within circuit 400, current actually begins to flow at a later point, as indicated by the lag between the beginning of interval 214, FIG. 2, and the downward jump 226.

The proximate cause of jump 226 is the connection between terminals 309 in FIGS. 3 and 4. When a large current is pumped into Q49, it is pulled off of white-peak capacitor C31, FIG. 3. This action rapidly lowers the white peak voltage applied to resistor R37, and thus lowers the threshold rapidly, as shown at 233, FIG. 2. The present embodiment changes the threshold rapidly by changing peak voltage. It would also be possible to modify circuit 300 so that white-jump circuit 400 would change the threshold directly, with or without changing the peak voltage. Circuit 400 is disabled during the latter parts of intervals 213 and 215. Since peak 221 has already reached the level of video 211 at those points, circuit 400 cannot further decrease the voltage on C31; thus, no jumps occur at those locations.

Figure 5:
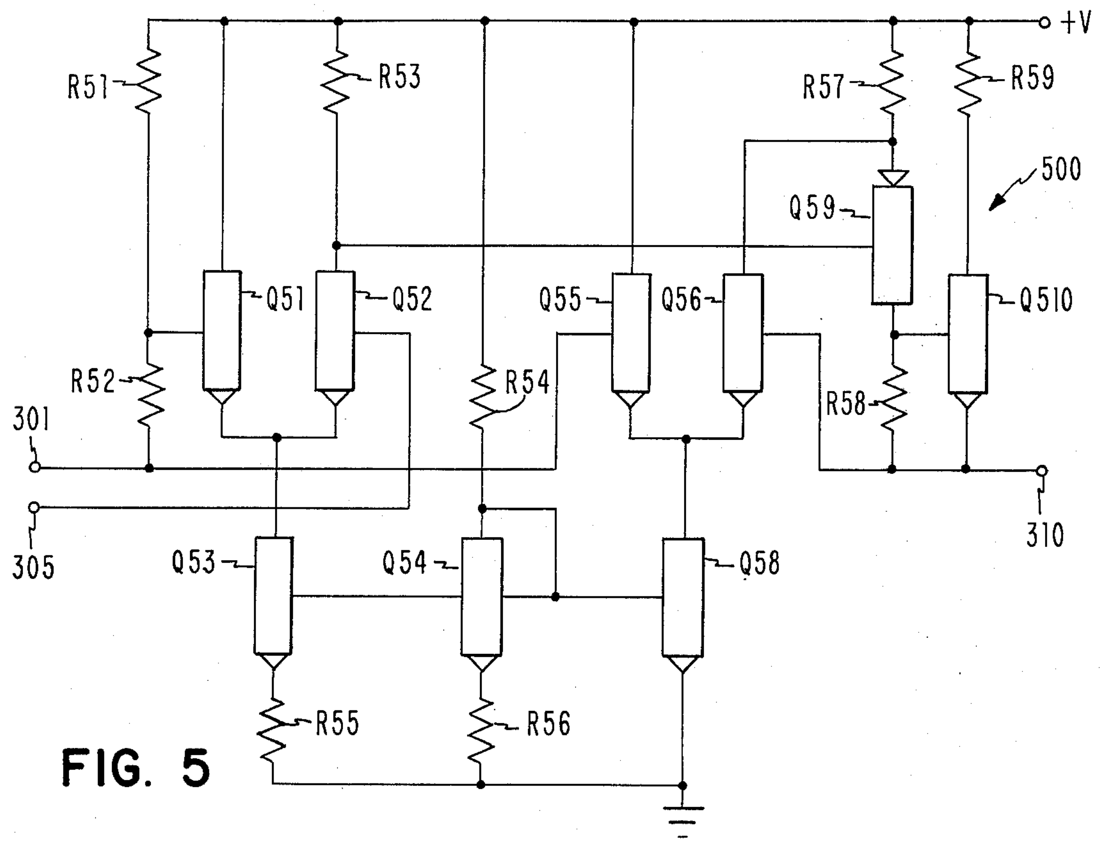
FIG. 5 shows a "black jump" circuit employed in the invention.

FIG. 5 is a circuit 500 for providing a complementary "black jump" effect. Transistors Q51–Q56 and Q58, and resistors R51–R56, operate as described for the corresponding components Q41–Q46, Q48 and R41–R46 in FIG. 4. The operation of circuit 500 may be understood by merely inverting all the signal waveforms 200 shown in FIG. 2. For example, the delayed video is offset below video signal 211 for the black-jump feature. Thus, delayed video from terminal 305 is fed into voltage divider R41–R42, and undelayed video goes to the right-hand input of the discriminator formed by Q51 and Q52, just the opposite from circuit 400. Since potential jump intervals now occur when the delayed offset video exceeds the original video, Q52 conducts during this condition, in order to enable control transistor Q59. This transistor remains in a conducting state until Q56 conducts, indicating that the output voltage at terminal 310 has increased to the video amplitude present at 301. The resulting voltage drop through R57 then cuts off Q59.

When Q59 conducts, the voltage drop across collector resistor R58 turns on a current-source transistor Q510, which pumps current toward terminal 310. Resistor R59 merely limits the dissipation in Q510. The current supplied to this terminal by Q510 rapidly increases the black peak voltage stored on C32. Again, the finite delays of circuit 500 cause the actual black-jump effect to lag the precise signal crossover point.

If black jumps are not necessary, circuit 500 may be simply omitted from an implementation of the invention. If only black jumps are desired, or if the white and black signal polarities of FIG. 2 are reversed, circuit 500 may be included and circuit 400 omitted. Although the desirability of white and black jumps arises from entirely separate causes, it is presently considered preferable to include both circuit 400 and circuit 500.

Representative component values for circuits 300, 400 and 500 may be as shown below. Resistances are in ohms, and capacitances are given in microfarads.

| | |
|---|---|
| C31=.003 | R46=33 |
| C32=.003 | R47=680 |
| R31=1200 | R48=68 |
| R32=1200 | R52=39000 |
| R33=1700 | R51=3000 |
| R34=1000 | R53=1600 |
| R35=1000 | R54=15000 |
| R36=1700 | R55=33 |
| R37=2000 | R56=33 |
| R41=39000 | R57=680 |
| R42=3000 | R58=1000 |
| R43=1600 | R59=700 |
| R44=15000 | |
| R45=33 | |

Having described a preferred embodiment thereof, I claim as my invention:

1. A thresholder for converting an analog video signal into a two-valued digital output signal, comprising:

delay means for producing a delayed signal from said video signal;

offset means for producing a delayed offset signal having a different absolute amplitude from said delayed signal;

follower means for storing a peak signal related to peak excursions of said video signal;

divider means for producing a threshold signal from said peak signal;

jump means for rapidly changing the amplitude of said threshold signal toward the amplitude of said video signal, when said video signal and said delayed offset signal bear a predetermined relation to each other;

discriminating means for producing a first value of said output signal when a signal derived from said video signal exceeds said threshold signal and for producing the other value of said output signal when said threshold signal exceeds said derived signal.

2. A thresholder according to claim 1, wherein said follower means produces said peak signals from white areas on an article.

3. A thresholder according to claim 1, wherein said jump means comprises:

a first discriminator for comparing said video signal and said delayed offset signal;

a second discriminator for comparing said video signal and said peak signal; and a controlled source coupled to said first and second discriminators and to said follower means for rapidly changing said peak signal when said video signal bears a first relation to said delayed offset signal.

4. A thresholder according to claim 3, wherein said controlled source is enabled when said video signal bears a second relation to said peak signal.

5. A thresholder according to claim 4, wherein said controlled source comprises:

a constant-current source coupled to said follower means; and a control transistor for enabling said constant-current source, said control transistor having a first electrode coupled to said first discriminator and a second electrode coupled to said second discriminator.

6. A thresholder according to claim 4, wherein said source is enabled when both said video signal exceeds said delayed offset signal and said peak signal exceeds said video signal.

7. A thresholder according to claim 4, wherein said source is enabled when both said delayed offset signal exceeds said video signal and said video signal exceeds said peak signal.

8. A thresholder according to claim 1, wherein said derived signal is said delayed signal.

9. A thresholder according to claim 1, wherein said follower means is adapted to change said peak signal slowly when said peak signal bears a predetermined relation to said video signal.

10. A thresholder according to claim 9, wherein said follower means is further adapted to store a further peak signal related to opposite peak excursions of said video signal and to change said second peak signal slowly when it bears a predetermined relation to said video signal.

11. A thresholder according to claim 10, wherein said divider means is adapted to produce said threshold signal as a predetermined fraction of a difference between said first and second peak signals.

12. A thresholder according to claim 10, further comprising:

further offset means for producing a further delayed offset signal;

further jump means for rapidly changing the amplitude of said further threshold signal toward said video signal when said video signal and said further offset signal bear a predetermined relation to each other.

* * * * *